Feb. 4, 1930.  J. J. HARTEN  1,745,573
VERTICAL SHAPING MACHINE
Filed Oct. 24, 1923   6 Sheets-Sheet 1

INVENTOR.
John J. Harten.
BY
ATTORNEY

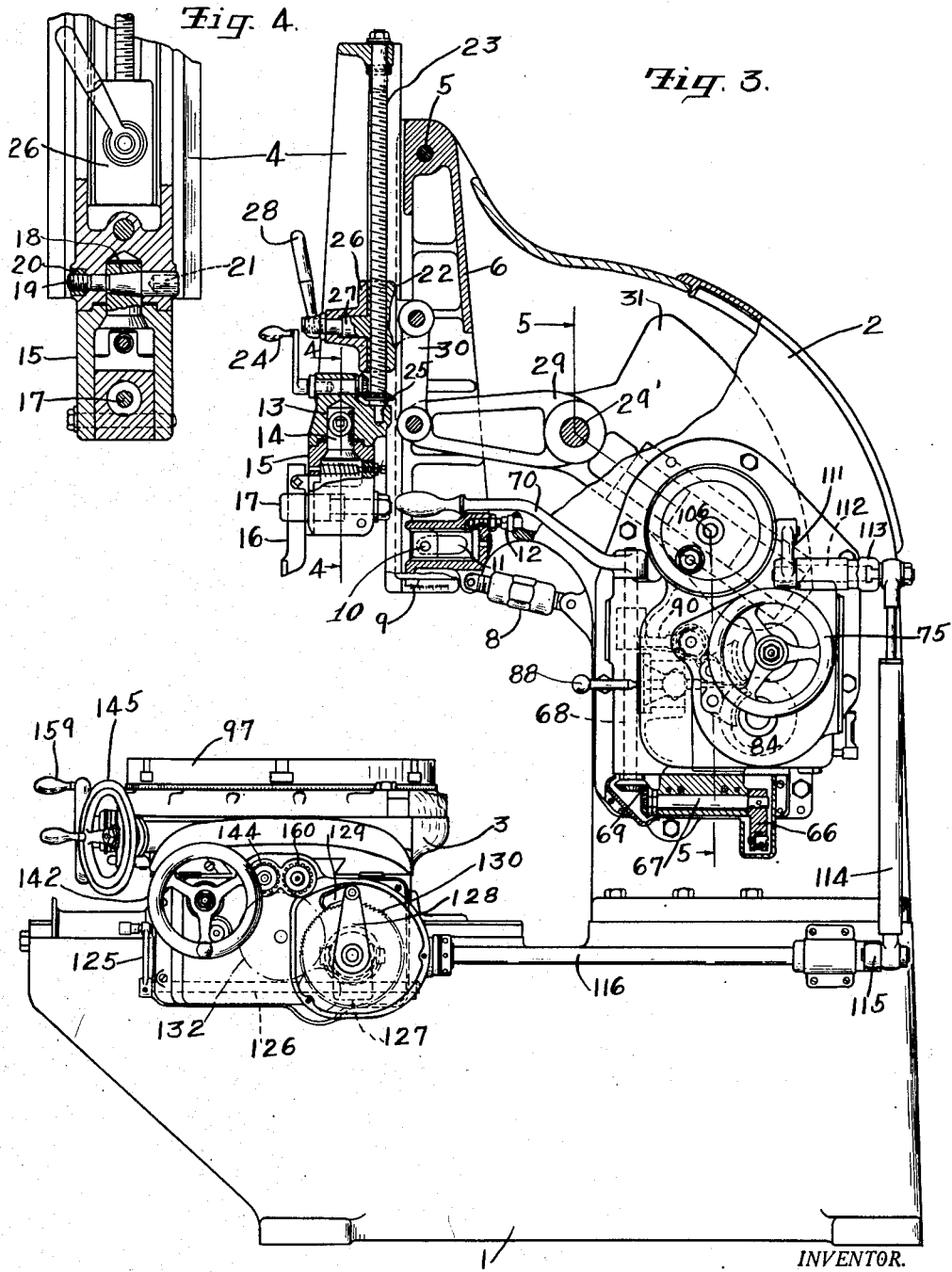

Feb. 4, 1930. J. J. HARTEN 1,745,573
VERTICAL SHAPING MACHINE
Filed Oct. 24, 1923 6 Sheets-Sheet 4
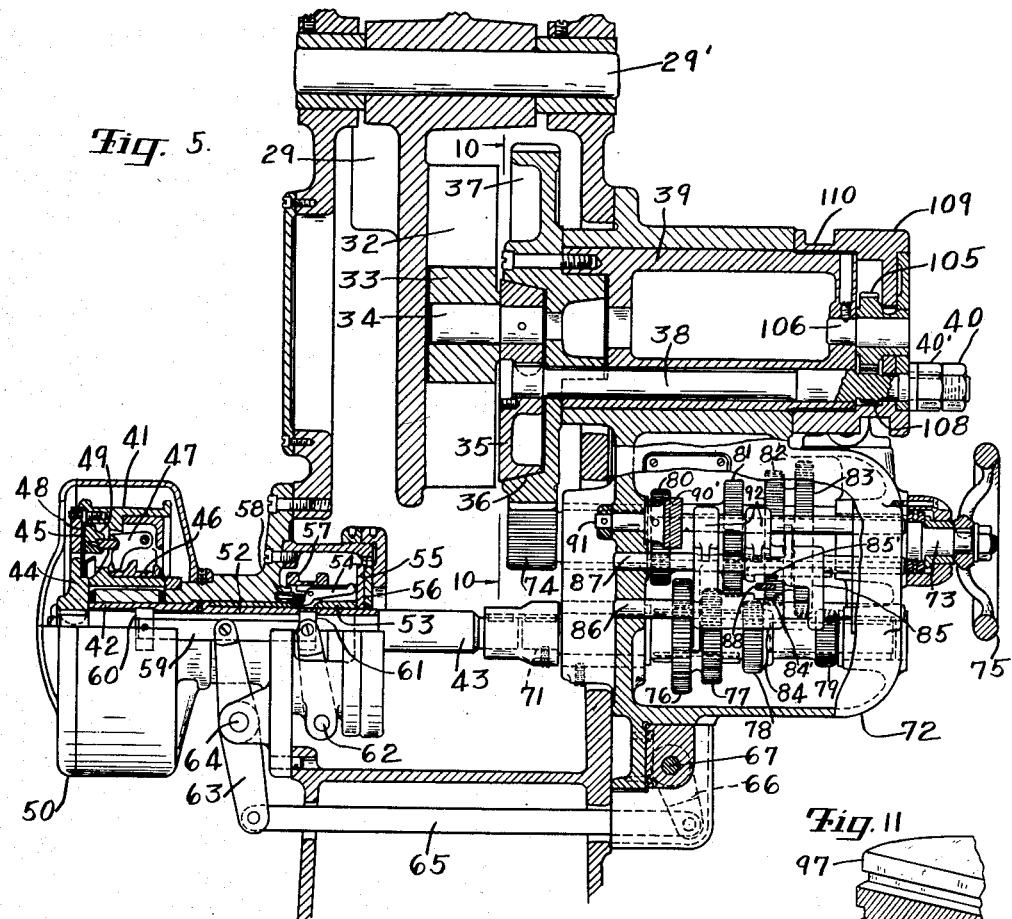
Fig. 5.
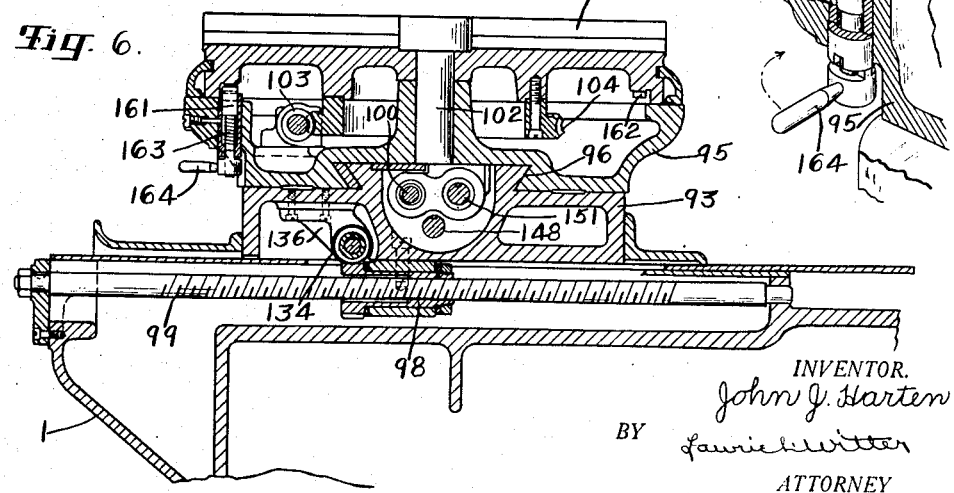
Fig. 6.
Fig. 11
INVENTOR.
John J. Harten
BY Laurie␣Witter
ATTORNEY

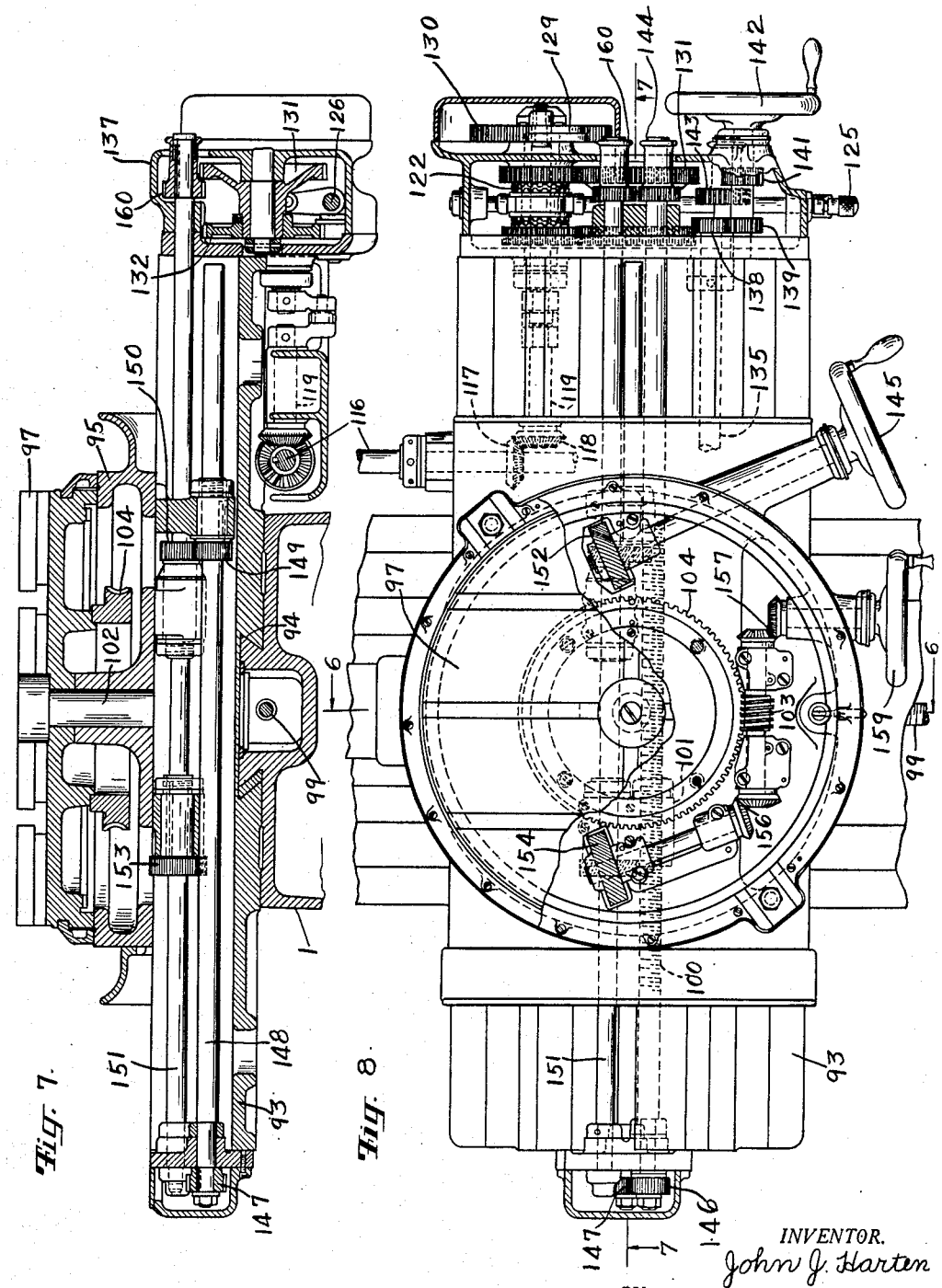

Feb. 4, 1930.  J. J. HARTEN  1,745,573
VERTICAL SHAPING MACHINE
Filed Oct. 24, 1923  6 Sheets-Sheet 6

INVENTOR
John J. Harten
BY
Lawrie Witter
ATTORNEY

Patented Feb. 4, 1930

1,745,573

UNITED STATES PATENT OFFICE

JOHN J. HARTEN, OF HARTFORD, CONNECTICUT, ASSIGNOR TO PRATT & WHITNEY COMPANY, OF NEW YORK, N. Y., A CORPORATION OF NEW JERSEY

VERTICAL SHAPING MACHINE

Application filed October 24, 1923. Serial No. 670,516.

This invention relates to machine tools and particularly to such machines as shapers, slotters and the like. The primary object of the invention is to provide an improved machine of this type. The machine shown in the accompanying drawings is a shaper of a general construction similar to that shown in Patent No. 1,084,544 to B. M. W. Hanson et al., the present invention however involving material improvements over the machine shown in the patent.

Certain objects of my invention involve the provision of novel improvements in the tool support and its guide and comprise improved means for rigidly securing the tool holder in its support and stop means for limiting the pivotal adjustment of the tool guiding member in the frame of the machine.

Other objects of my invention involve improvements in the means for reciprocating the tool holder and feeding the work support in synchronism therewith, such means comprising the introduction of change gears with clutch and brake means in connection with the tool reciprocating mechanism and an improved arrangement of means for feeding the work support from the tool reciprocating mechanism.

A further object of my invention relates particularly to the provision of improved means in connection with the work support feeding mechanism for manually adjusting the work supports, such means preferably including a pair of hand wheels on the slide adapted respectively to adjust the slide on its support and to rotate the work table supported on the slide.

With the above and other objects in view, my invention consists in the features of construction and operation set forth in the following specification and illustrated in the accompanying drawings. In such drawings annexed hereto and forming a part of this specification, I have shown certain embodiments of my invention in a vertical shaper but it will be understood that the invention can be otherwise embodied and that the drawings are not to be construed as defining or limiting the scope of the invention, the claims appended to this specification being relied upon for that purpose.

Referring to the figures of the drawings:

Fig. 3 is a side elevation thereof partially in section.

Fig. 4 is a detail sectional view taken on line 4—4 of Fig. 3.

Fig. 5 is a sectional view through the column of the machine on line 5—5 of Fig. 3.

Fig. 6 is a fragmentary vertical sectional view through the work support on line 6—6 of Fig. 8.

Fig. 7 is a like view taken on line 7—7 of Fig. 8.

Fig. 8 is a plan view of the work support, certain parts being broken away.

Fig. 9 is a fragmentary rear view of the machine.

Fig. 10 is a fragmentary view taken on line 10—10 of Fig. 5.

Fig. 11 is an enlarged fragmentary view showing the table locking bolt.

Figure 1:
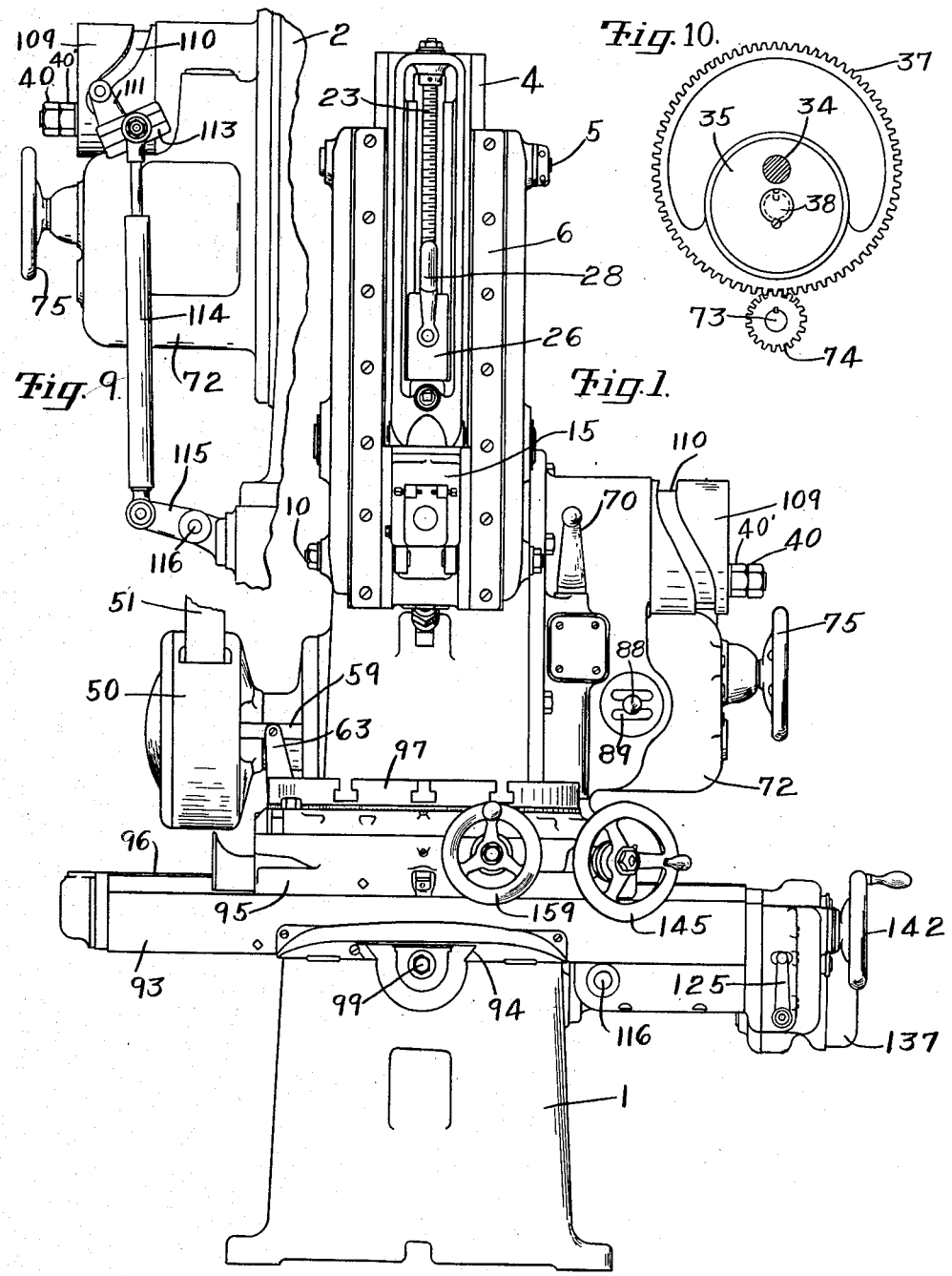
Figure 1 is a front elevation of a shaper involving my invention.
Figure 2:
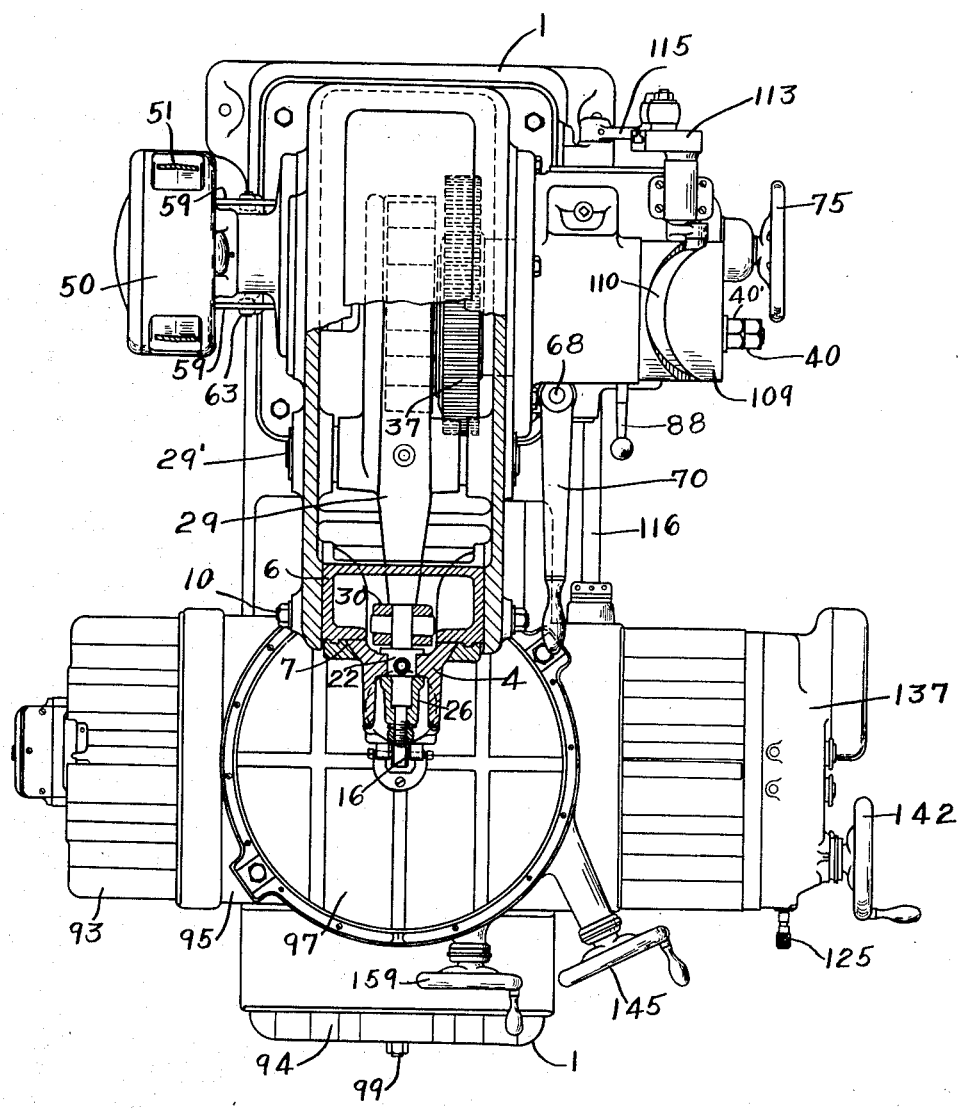
Fig. 2 is a plan view thereof partially in section.
Figure 12:
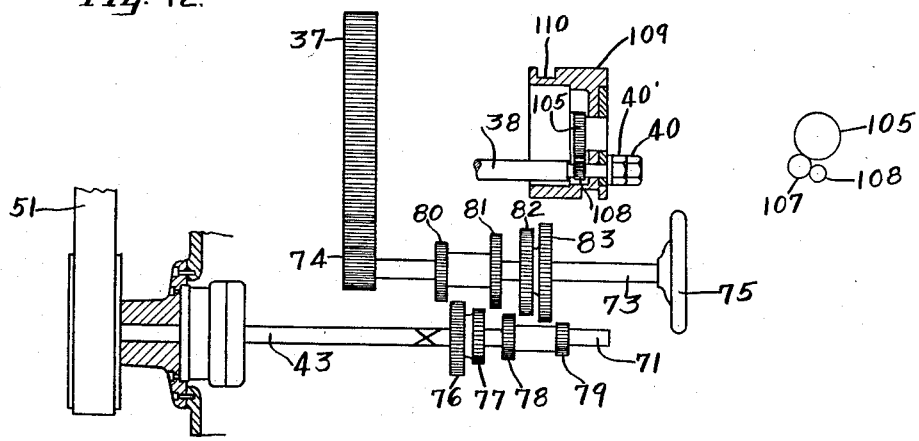
Fig. 12 is a diagrammatic view of the driving mechanism for reciprocating the tool holder.
Figure 13:
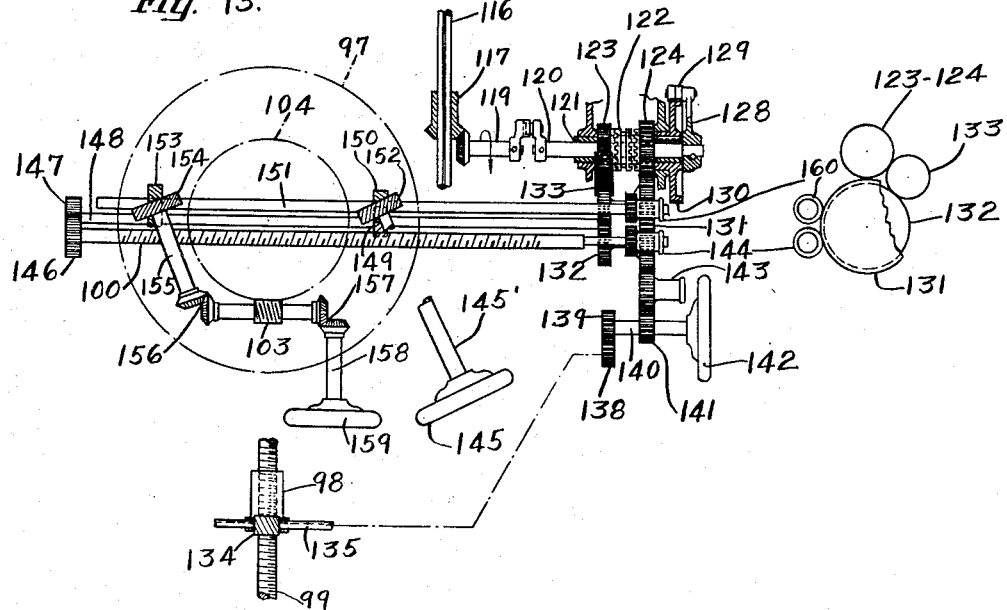
Fig. 13 is a diagrammatic view of the mechanism for operating the work supporting members.

Referring more specifically to the drawings, 1 indicates the base of the machine having a vertically extending column 2 secured on one end thereof and a compound work support 3 slidably mounted on the other end. A tool support or slide 4 is supported on the column over the work support.

The tool slide is supported as follows: Pivoted to the column at 5 is a member 6 provided with a vertical guideway 7 in its forward face. The tool support 4 is slidably mounted in this guideway. A turnbuckle 8 adjustably connects the lower end of the member 6 to the column. The member can be adjusted about its pivot 5 by rotating the nut of the turnbuckle. An index 9 is provided for indicating the amount of such adjustment. A clamping bolt 10 is also provided in the column and extends through a slot 11 in the member 6 for rigidly securing the member in its adjusted position. A pair of cooperating stops at 12 positively limit the movement of the member 6 toward the column, one of such stops being screw threaded for adjusting the same. Such screw threaded element is normally adjusted to a position wherein the guideway 7 will be in a vertical line when the stops are engaged.

The lower end of the slide 4 is provided with a bore 13 therein for receiving the shank 14 of a tool holder 15, a tool 16 being secured in the holder by a clamping bolt 17. This mechanism is described in detail in the above cited patent. The shank 14 of the tool holder is provided with a transverse bore 18 therein for receiving a taper pin 19 extending through registering bores in the slide. One end of this pin is threaded into a nut 20 and the other end thereof is socketed at 21 for receiving a socket wrench. By referring to Fig. 4, it will be noted that the bore 18 is so shaped that the taper pin engages against the upper wall only thereof. In this manner the entire wedging effect of the taper pin functions to draw the tool holder upwardly into tight engagement with the slide.

A block 22 is threaded to a screw 23 rotatably mounted in the slide 4. The screw may be rotated to adjust the block therealong by a handle 24 operative through a pair of bevel gears 25. An element 26 is mounted on a stud 27 extending from the block 22. The element 26 can be drawn tightly into clamping engagement with the slide by means of a handle 28 threaded to the stud. It should be understood that the block is thus rigidly secured to the slide after being adjusted by the handle 24.

One end of a lever 29 pivoted in the column at 29' is connected to the block 22 by means of a link 30. The other end of this lever is counterweighted at 31 and slotted at 32 to receive a block 33 mounted on a stud 34. The stud 34 is mounted eccentrically in a disk 35 in a tapered counter-bore 36 formed eccentrically in a driving gear 37. The disk is secured to a shaft 38 rotatably mounted in a drum 39, the drum being rotatably mounted in the column and supporting the gear 37 on its inner end. The shaft 38 extends entirely through the drum and a nut 40 thereon serves to draw the disk securely into the counterbore 36.

The gear 37 is rotated from a main driving element, as a belt pulley 41 loose on a sleeve 42 surrounding the main driving shaft 43. An element 44 is keyed to the end of shaft 43 and has secured thereto an annular friction plate 45. A collar 46 slidably mounted on the hub of the pulley is adapted to operate through toggle mechanism, including a plurality of pivoted elements 47, to grip the plate 45 between a fixed plate 48 and a movable block 49 on the pulley. Movement of the collar 46 to the left (Fig. 5) therefore operates to clutch the pulley 41 to the shaft 43. This mechanism comprises the subject matter of a patent to John J. Thacher No. 1,588,064, granted June 8, 1926. A guard 50 encloses the pulley which is adapted to be driven by a belt 51.

Slidably mounted on a supporting sleeve 52 is an annular member 53 slotted radially to carry a plurality of levers 54. A friction disk 55 secured to the member 53 is adapted to engage a friction disk 56 rigidly secured to the frame of the machine. A ring 57 is adapted to slide over the member 53 and engage the long ends of the levers. Such engagement forces the short ends of the levers against washers 58 and moves the member 53 to the right (Fig. 5) and the friction disk 55 against the friction disk 56. This movement of the ring 57 to the right engages the friction disks which act as a brake to stop the rotation of the shaft 43. It will be understood that the sleeve 52 is keyed to the shaft 43 and the member 53 is splined to the sleeve.

A pair of bars 59 have a yoke 60 at one end engaging in an annular groove in the collar 46 and a yoke 61 at the other end engaging in an annular groove in the ring 57. The yoke 61 is pivotally supported at 62 and a lever 63 pivoted at 64 has its upper end bifurcated and connected to the bars. A link 65 connects the lower end of this lever with an arm 66 on a horizontal shaft 67. The shaft 67 is connected to a vertical shaft 68 by means of bevel gears 69. An operating handle 70 is secured to the upper end of the shaft 68. Movement of the handle in one direction is adapted to move the bars 59 with the collar 46 and ring 57 in a direction to disengage the clutch and apply the brake and movement of the handle in the opposite direction is adapted to disengage the brake and apply the clutch.

The main driving shaft 43 is operatively connected to a change speed gearing shaft 71 within a gear box 72. It will be noted that the driving pulley 41 is on the rear side of the machine and the gear box 72 is on the front side thereof. A shaft 73 parallel with the shaft 71 has a pinion 74 on its inner end in mesh with the gear 37. A hand wheel 75 is mounted on the outer end of shaft 73. The change speed gearing comprises four gears 76, 77, 78 and 79 on shaft 71 adapted respectively to cooperate with gears 80, 81, 82 and 83 on shaft 73. An element 84 is adapted to shift gears 76 and 77 to engage the cooperating gears 80 and 81 and an element 85 is adapted to shift gears 82 and 83 to engage the cooperating gears 78 and 79. The elements 84 and 85 are slidably mounted on rods 86 and 87 supported in the box 72. A handle 88 extending through an H-slot 89 in the wall of the column is adapted to engage in a notch 84' of the shifter 84 or in a notch 85' of the shifter 85 whereby to shift such elements and the gears connected thereto.

An arm 90 on the vertical shaft 68 has spiral teeth on its free end in mesh with a spiral gear 90' on a shaft 91. A pair of elements 92 on this shaft are adapted to engage in recesses in the shifters 84 and 85 when the gears are in the unmeshed position illustrated in Fig. 5 and on one side or the other of such shifters when the gears are in the meshed position. Rotation of the shaft 68 operates through the arm 90 and gear 90' to rotate the shaft 91 and thus engage or disengage the elements 92 relative to the shifters. This mechanism therefore forms an interlock to permit engagement of the clutch 45 only when the gears are in the fully meshed or demeshed positions and permit shifting of such gears only when the clutch is disengaged.

It should be particularly noted that the operation of the machine as thus far described is controlled by the handles 70 and 88 located on the column directly in front of the operator's usual position at the machine. Merely by movement of the handle 70, the operator has full control of the starting and stopping of the machine and, by shifting the handle 88, he may operate the slide 4 at any one of the four speeds. The brake serves to almost instantly stop the slide and its operating mechanism at the end of each cutting operation. In this manner, considerable time is saved which would otherwise be used in permitting the machine to stop itself after each cut and when it is desired to change work pieces. Also the brake acts as a safety device to stop the machine in case of emergency thereby preventing accident and injury. Furthermore when desiring to shift the change speed gears, the handle 70 may be operated to apply the brake and stop the rotation of such gears whereby they may be shifted without delay. When the change gears are in the disengaged position illustrated in the drawings, the slide 4 can be adjusted manually from the hand wheel 75.

The work support 3 comprises a saddle 93 slidably mounted on ways 94 of the base 1, a slide 95 mounted on ways 96 of the saddle and a work table 97 rotatably mounted on the slide. The saddle is adapted to be moved on its ways 94 by means of a nut 98 rotatably mounted in the saddle and threadedly engaging a screw 99 non-rotatably mounted in the base. The ways 96 extend transversely of the ways 94 and the slide is adapted to be moved on its ways 96 by means of a screw 100 rotatably mounted in the saddle and threadedly engaging a nut 101 secured to the slide. The table 97 is mounted for rotation about a pin 102 extending into the slide and is adapted to be rotated by a worm 103 engaging a worm wheel 104 secured to the under side of the table.

The work supporting members just described are adapted to be operated either manually or by power. A gear 105 loose on a shaft 106 mounted coaxially in the drum 39 is operatively connected through an idler pinion 107 to a pinion 108 secured to or integral with the shaft 38. A drum cam 109 provided with a camp path 110 therein is keyed to the gear 105 and extends cap-like over the outer end of the drum. An arm 111 on a shaft 112 has a stud in its free end engaging in the cam groove 110. Another arm 113 on the shaft 112 is connected by a link 114 to an arm 115 on a shaft 116. The link can be adjusted radially along the arm 113.

The shaft 116 extends forwardly beneath the saddle 93 and the front end thereof is splined to receive a bevel gear 117. This gear meshes with a bevel gear 118 on a shaft 119 operatively connected to a shaft 120. Loose on the shaft 120 is a sleeve 121 to which is splined a clutch 122 adapted to be engaged with either of two gears 123 and 124 loose on the sleeve. The clutch can be shifted by means of a handle 125 connected by a shaft 126 to a clutch engaging yoke 127. An arm 128 secured to the outer end of shaft 120 carries a pair of pawls 129 adapted to engage ratchet teeth on a ratchet wheel 130 keyed to the sleeve 121. The gear 124 meshes directly with a gear 131 and the gear 123 is operatively connected to a gear 132 through an idler 133, the gears 131 and 132 being rigidly connected together. The saddle 93, slide 95 and table 97 are adapted to be operated from the gear 131 as hereinafter described.

A worm 134 splined to a shaft 135 and journaled to rotate in a bracket 136 secured to the under side of the saddle is in mesh with the saddle moving nut 98. The shaft 135 extends forwardly to within the saddle gear box 137. A gear 138 on the shaft 135 meshes with a gear 139 on a shaft 140. The shaft 140 carries a second gear 141 and a hand wheel 142. A slip gear 143 is provided for operatively connecting the gear 141 to the gear 131. The gear 143 is adapted to be slid axially into and out of mesh with such gears. This gear is placed in mesh for power operating the saddle and is slid out of mesh when it is desired to manually move the saddle by the hand wheel 142.

Slidably splined to the screw 100 is a pinion 144. The screw is rotated for power moving the slide by meshing this pinion with the gear 131. To manually rotate the screw, the pinion 144 is disconnected from the gear 131 and the screw is rotated from a hand wheel 145 through the following mechanism: A gear 146 on the rear end of the screw meshes with a gear 147 on a shaft 148 parallel with the screw. A gear 149 splined to the shaft 148 is in mesh with a gear 150 loose on a parallel shaft 151. The gears 149 and 150 are rotatably mounted in bearings connected to the slide 95. A spiral gear 152 on the inner end of the hand wheel shaft 145' is in mesh with the gear 150. Therefore with the pinion 144 disconnected from the gear 131 the screw 100 can be rotated to move the slide by rotating the hand wheel 145.

Rotatably journaled in the slide and splined to the shaft 151 is a spiral gear 153. A spiral gear 154 on a shaft 155 meshes with the gear 153. The shaft 155 is connected by bevel gears 156 to the shaft supporting the worm 103. Bevel gears 157 connect the worm shaft with a shaft 158 supporting a hand wheel 159 thereon. The table can be rotated manually from the hand wheel and the same can be rotated by power by sliding a slip gear 160 splined to the shaft 151 into mesh with the gear 131.

The table may be locked against rotation by means of a bolt 161 normally forced into engagement with teeth 162 on the table by means of a spring 163. The bolt may be withdrawn and held in the inoperative position by means of a handle 164.

It will be understood that the tool slide 4 is reciprocated vertically and that one or more of the work supporting members are intermittently moved to feed the work after each cutting stroke, such movement of course taking place upon the non-cutting or upward movement of the slide. The drum cam 109 functions through the mechanism heretofore described to oscillate the shaft 116 at each reciprocation of the slide, such oscillation being in a direction to rotate the shaft 120 anti-clockwise (Fig. 3) as the slide moves upwardly. Such rotation operates through the pawls 129 to drive the sleeve 121 and clutch 122. The clutch can be shifted in a manner to drive the gear 131 in either direction whereby to feed the work supporting members in the directions desired. The saddle 93, slide 95 and table 97 may be selectively fed as desired by respectively sliding the slip pinion 143, 144 and 160 into mesh with the gear 131. The amount of feeding movement can be varied by adjusting the link 114 radially of the arm 113.

The convenient arrangement of the mechanism for manually operating the work supporting members should be particularly noted. Hand wheels 142, 145 and 159 are adapted respectively to operate the saddle 93, slide 95, and table 97, the slip pinions 143, 144 and 160 of course being in the disengaged position at such time. The hand wheel 142 is mounted most conveniently for the operator on the saddle gear box 137 and rotation of such hand wheel to the right operates to move the saddle to the right, i. e. toward the column. Both hand wheels 145 and 159 are mounted on the slide 95 directly adjacent the operator's usual position when watching the cutting operation. Rotation of the hand wheel 145 to the right operates to move the slide to the right, i. e. toward the gear box 137. It will therefore be seen that rotation of either hand wheel 142 and 145 operates to move its member in the same direction in which the top of the hand wheel moves. This manner of moving the work supports is most natural and the operator readily familiarizes himself with the same without the usual difficulty of learning the relation of the hand wheel movements to the table movements. The operation of the hand wheel 159 is similar to those just described, rotation of the same to the right being adapted to rotate the table away from the hand wheel. It will be understood that by mounting both hand wheels 145 and 159 on the slide, such hand wheels are always in the same relative position and very convenient to the operator.

As fully described in the before mentioned patent, the function of the disk 35 and its cooperating mechanism is to vary the reciprocating stroke imparted to the tool slide 4. As illustrated in Fig. 5, the stud 34 is coaxial with the gear 37 and its supporting drum 39. As thus adjusted, rotation of the gear will impart no motion whatever to the lever 29. However, the disk can be rotatably adjusted to move the stud 34 to a position eccentric of the gear, and the greater such eccentricity the greater will be the throw of the lever. The disk can be rotatably adjusted by loosening the nut 40 and rotating the shaft 38 by means of a splined nut element 40' on shaft 38 adjacent the nut 40. In this adjustment, the position of the stud 34 is varied circumferentially as well as radially of the gear 37. This circumferential variance of course results in a variation in the position of the slide 4 relative to the angular or rotary position of the gear 37. The gearing connecting the cam 109 and the disk 35 is such however as to compensate for this variation in a manner to insure the proper timing of the feeding of the work supporting members from the cam whatever may be the adjustment thereof. The operation of this mechanism is the same as that disclosed in the before mentioned patent and the same is described in detail therein.

What I claim is:

1. In a machine tool, the combination of a frame, a member pivoted thereto, a tool support carried by the member, turnbuckle means for adjusting the member about the said pivot, clamping means for said member, and means comprising cooperating stops one of which forms a fixed abutment on the member and frame remote from the pivot and the other member forms an adjustable stop threaded into the pivoted member for limiting the pivotal movement of the member toward the frame.

2. In a machine tool, the combination of a frame, a member pivoted thereto, a tool support mounted for sliding movement in a guideway on the member, means for reciprocating the tool support in the guideway, turnbuckle means for adjusting the member about the said pivot to vary the direction of movement of the tool support, clamping means for said member, and means comprising cooperating stops one of which forms a fixed abutment on the member and frame remote from the pivot and the other member forms an adjustable stop threaded into the pivoted member for limiting the pivotal movement of the member toward the frame.

3. In a machine tool, the combination of a frame, a member pivoted thereto, a tool support carried by the member, turnbuckle means for adjusting the member about the said pivot, clamping means for said member, and means comprising a fixed abutment positioned in said frame and a screw threaded into said member forming cooperating stops remote from the pivot for limiting the pivotal movement of the member in one direction and adapted to rigidly support the slide in any intermediate adjusted position.

In testimony whereof, I hereunto affix my signature.

JOHN J. HARTEN.